Sept. 23, 1952 M. EATON 2,611,852
ELECTRIC BOILER
Filed Aug. 25, 1950 4 Sheets-Sheet 1

M. Eaton
INVENTOR
by D.R. Morrison
AGENT

Sept. 23, 1952     M. EATON     2,611,852
ELECTRIC BOILER

Filed Aug. 25, 1950     4 Sheets-Sheet 3

M. Eaton
INVENTOR
by D.R. Morrison
AGENT

Sept. 23, 1952    M. EATON    2,611,852
ELECTRIC BOILER

Filed Aug. 25, 1950    4 Sheets-Sheet 4

M. Eaton
INVENTOR
by D.R. Morrison
AGENT.

Patented Sept. 23, 1952

2,611,852

UNITED STATES PATENT OFFICE 2,611,852

ELECTRIC BOILER

Milton Eaton, Shawinigan Falls, Quebec, Canada, assignor to The Shawinigan Water and Power Company, Montreal, Quebec, Canada, a corporation of Quebec.

Application August 25, 1950, Serial No. 181,530

16 Claims. (Cl. 219—40)

Introduction

This invention relates to improvements in electric steam generators of the electrode type and more particularly to those in which the electrodes are normally partially submerged in the boiler water and the load is regulated by raising or lowering the water level.

Electric steam generators, or more briefly electric boilers, of this type are built for operation at voltages up to 13,800 volts, 3 phase. Although the three electrodes pertaining to the three phases are usually mounted in a single pressure vessel, it is sometimes an advantage to place them in separate pressure vessels. The boilers are known as single tank and 3-tank electric boilers respectively. The 3-tank design is limited to large boilers and for operation at the higher voltages. In each case steam is raised by the passage of electric current through the boiler water. The power input and rate of evaporation depend on the total electrical resistance of the conducting body of water, which may be regulated by varying the water level on the electrodes.

Electric boilers of the class referred to have a number of imperfections that tend to make their operation unsatisfactory. The size and arrangement of electrodes are such that the cross-sectional area of the conducting body of water decreases as the current paths converge on the electrodes, causing proportionately increasing electrical resistance. For this reason there is more energy dissipated and more steam generated per unit volume of water near the electrodes than elsewhere in the boiler. Steam tends to adhere to the electrodes and to accumulate on them, further increasing the contact resistance and creating a voltage gradient such that arcing occurs along the surfaces of the electrodes. The arcing aggravates the condition and is responsible for (a) accelerating the corrosion of electrodes and (b) creating turbulence that is conducive to foaming and priming. Another objectionable feature is that the minimum load for high voltage boilers is at least 10% of their rated capacity as determined by the minimum electrode immersion. Current density and arcing conditions cause the electrodes to corrode away at their lower ends. If the water level falls below the electrodes an arc forms that usually results in a short circuit causing the boiler circuit breaker to trip. For these reasons the minimum safe electrode immersion for electric boilers operating at 2,200 volts is about 6″, with as much as 12″ allowed for higher voltages.

Objects

The principal objects of the invention are (1) to provide means for obviating the concentration of steam around the electrodes thereby preventing arcing on their surfaces, (2) to provide means for obtaining a load range of from full load to less than 1% of full load.

Detailed description

The invention may be understood from the following detailed description of preferred embodiments of it, reference being made to the accompanying drawings in which—

Figure 1:
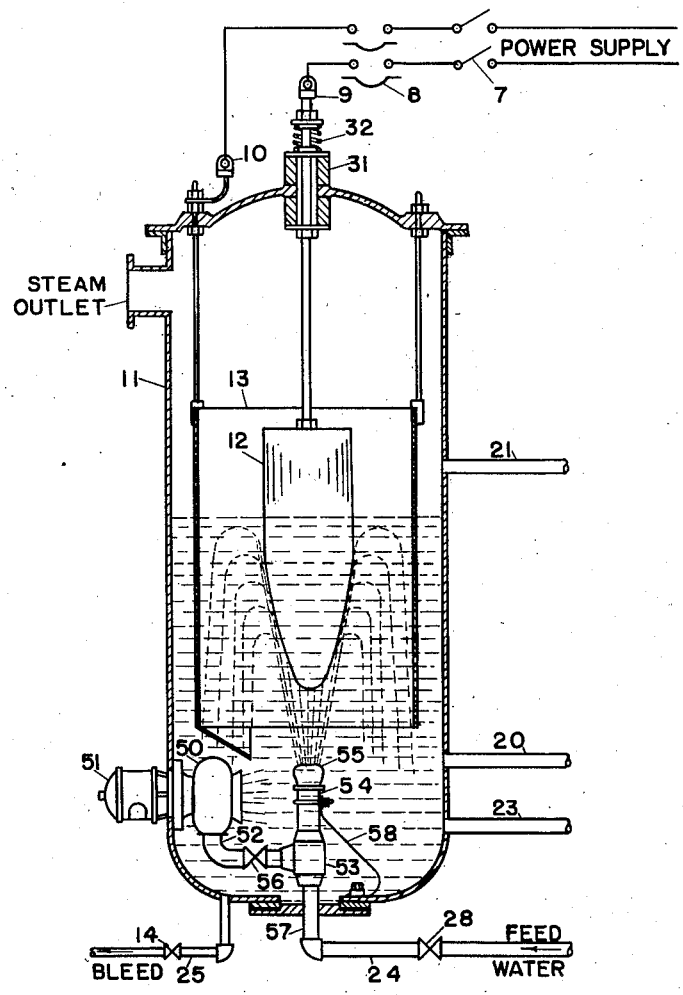
Figure 1 is a sectional view of this type of boiler and apparatus associated with it.
Figure 5:
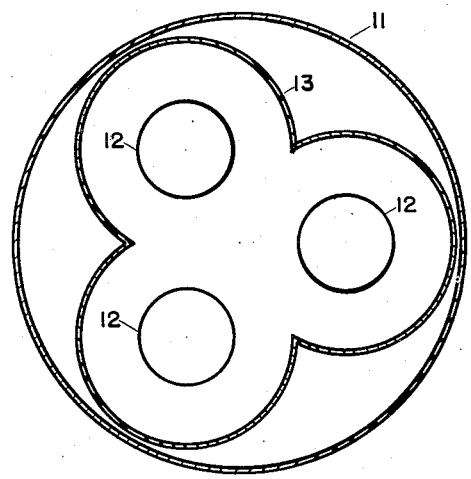
Figure 5 is a horizontal sectional view of a single tank, 3-phase electric boiler showing the arrangement of electrodes and neutral shell.

A sectional view of the type of boiler referred to is shown in Figure 1. It consists essentially of a pressure vessel 11 in which an electrode 12 is located and from which it is insulated by insulator 31. A shell 13 serves as the other terminal to complete the electric circuit. The boiler feed water is admitted through valve 28 and the steam generated passes through the steam outlet. For simplicity a single central electrode is shown with a single phase power supply, whereas in actual practice electric boilers of this type are usually built with three electrodes for three phase operation in which case shell 13 serves as a grounded neutral, as illustrated in Figure 5. Pipes 20, 21 and 23 are associated with automatic control apparatus, for example, that described in U. S. Patent 2,453,210. The locations of 20 and 21 on the boiler determine the lower and upper limits of water level respectively. In the conventional boiler of this type, pipe 20 terminates 6 to 12 inches above the lower tip of the electrodes, but in a boiler equipped with the apparatus of this invention, pipe 20 will terminate below the tip by a distance at least as great as the distance between the electrodes or the distance between an electrode and surrounding shell, and preferably at least as great as the electrode diameter. As used in this application, the term electrode does not include the surrounding shell 13.

The new apparatus includes a pump 50 driven by motor 51, having intake communication in the boiler water below the lowest operating level thereof, and connected by pipe 52 to a distributor 53 with which water spouts 54 and feed-water supply 57 are connected. The water spouts have caps 55 and are solidly grounded to the boiler shell by connections 58. A valve 56 serves to adjust the rate of flow through pipe 52. A water spout is located directly under and pointing towards the bottom of each electrode and terminates at a distance from the electrode of not less than the minimum distance between electrodes or between an electrode and surrounding shell, and preferably not less than the electrode diameter. The boiler feed water, directed into the distributor, serves to increase the velocity and volume of water in the water spouts, and to lower its temperature.

Figure 2:
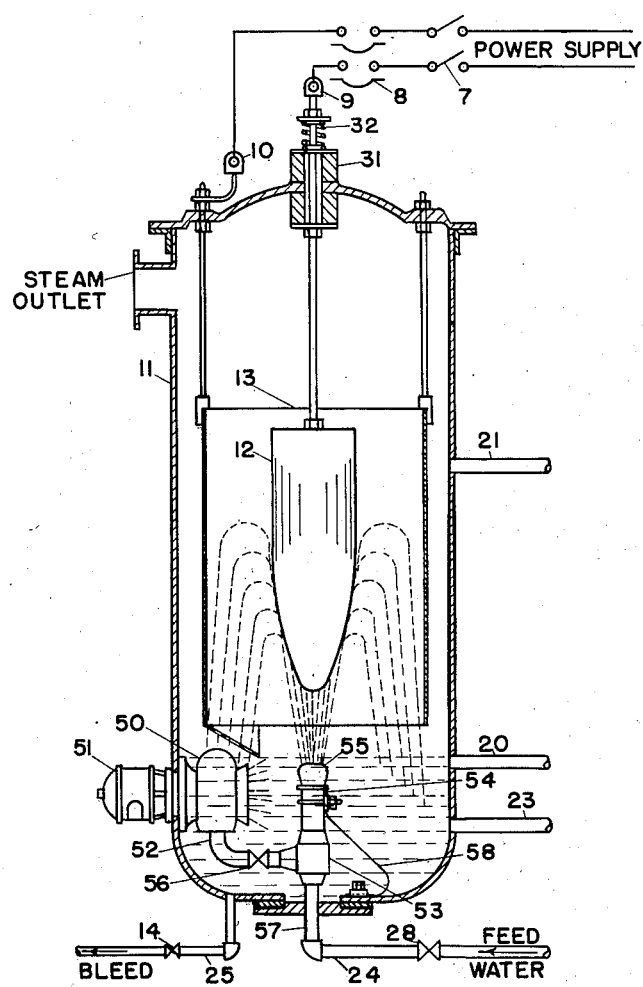
Figure 2 is a sectional view of the same type of boiler illustrating conditions at minimum load.

The water spouts are preferably provided with replaceable caps that are made of cast iron with sufficient thickness of metal to withstand the corrosive action of the electric current. The bore is tapered, as indicated, to spread the spouts of water so that they will cover the lower ends and climb the sides of the electrodes. The water spouts and neutral shell of a 3-phase boiler are mechanically and electrically connected with the boiler shell forming a grounded, 3-phase neutral. The electrodes 12 are preferably made of cast iron, cylindrical in shape with cored centers. The lower part should preferably be tapered to a rounded end of which the vertical section is parabolic as indicated in Figures 1 and 2.

Figure 6:
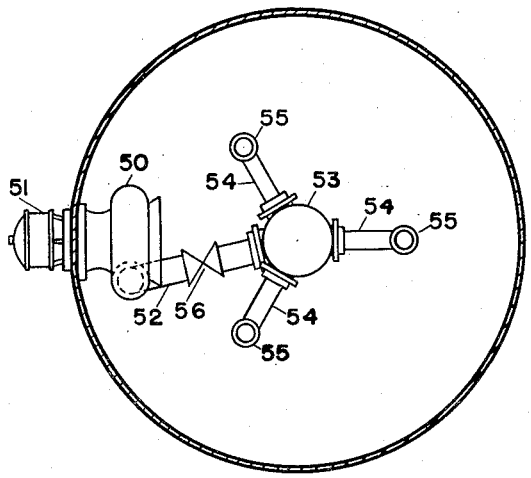
Figure 6 is a plan view showing the arrangement of apparatus associated with the boiler illustrated in Figure 5.

Figure 1 illustrates a preferred arrangement of the apparatus for a single phase or a 3-tank, 3-phase electric boiler and Figure 6 is a plan view showing the arrangement of apparatus for a single tank, 3-phase electric boiler.

Figure 3:
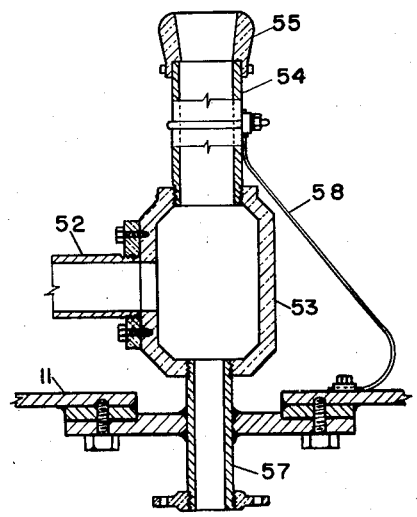
Figure 3 is an enlarged sectional view of part of the new apparatus associated with a single phase electric boiler or with a 3-tank, 3-phase electric boiler.
Figure 4:
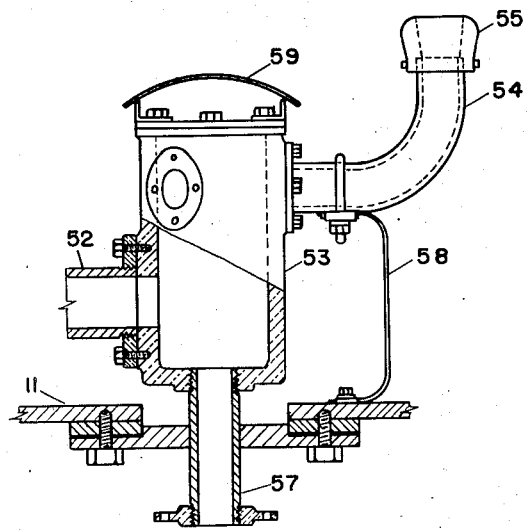
Figure 4 is an enlarged sectional view of a similar part of the apparatus associated with a single tank, 3-phase electric boiler.

Figures 3 and 4 are enlarged sectional views of distributors with connected parts for 3-tank, 3-phase and single tank, 3-phase electric boilers respectively. The distributor 53 for the single tank, 3-phase electric boiler, as shown in Figure 4, also is preferably provided with a replaceable cap 59, secured over its top, to protect it against the corrosive action of the electric current.

Obviously other arrangements of the apparatus are possible. For instance all the parts, with the exception of the water spouts, could be located outside the boiler, and the motor could be replaced by any suitable driving means. A variable speed drive would make valve 56 unnecessary. Another modification is the arrangement of the feed water pipe is such a way as to direct the feed water towards the intake of the circulating pump, instead of directly into the distributor. The arrangement as illustrated is designed to minimize cost and maintenance and at the same time to obtain the most effective water-spout action.

As boiler water is evaporated, the concentration of salts in solution increases and is held within limits by bleeding. Because of the concentration of electrolytes, metals in contact with the boiler water are subject to galvanic corrosion that may be reduced by avoiding the use of metals widely separated in the electrochemical series. It is preferable to limit the choice of metals to steel and cast iron.

Operation

The water-spout apparatus simply takes water from below the lowest operating water-level of the boiler and spouts it up against the bottom of the electrodes. When the boiler water level is at its lowest limit, as illustrated in Figure 2, the spouts of water have sufficient cross-sectional area to cover the electrode ends effectively and sufficient velocity to reach part way up their sides. The spouts of water act as conductors and provide a path of relatively small cross-section and high resistance for the current for low loads when the water-level falls below the bottom of the electrodes.

Since the electrical resistance of the conducting body of water is inversely proportional to its cross-sectional area and directly proportional to its length, the resistance and the load corresponding with minimum load conditions, as illustrated in Figure 2, are such that the load range is from full load to less than 1% of full load. If the water spouts are made of insulating material, such as hard glass, the load may be decreased practically to zero without interrupting the power supply.

When the spout of water is appreciably below steam temperature, it decreases the steaming rate at the electrode surfaces. The forced circulation of water also facilitates the release of steam. For these reasons steam does not accumulate on the electrode surfaces and high contact resistance accompanied by arcing is thereby avoided. Conventionally, electrode current density is restricted to prevent arcing. With water-spout action and corresponding decreased resistance, increased electrode current density is permissible. Consequently, application of water-spout action to an electric boiler increases the load range in the direction of maximum loads as well as in the direction of minimum loads.

Additional advantages are obtained by arranging the apparatus so that the feed water enters the distributor through the connection 57 and accelerates the flow through the water spouts. The rate of feed water flow is proportional to the load and as the load increases the water level rises on the electrodes. As the water level rises, the resistance to water spout flow increases and consequently the increasing feed water flow helps to maintain effective water circulation up the side of the electrodes as illustrated in Figure 1.

The apparatus of this invention is also applicable to boilers with partially submerged electrodes wherein the water level is controlled by methods other than those involving the use of pipes like 20 and 21 to limit the upper and lower levels of boiler water, for example as in U. S. Patent 1,462,350.

The various advantages of the method and apparatus disclosed will be apparent to those skilled in the art.

It will also be understood that various modifications may be made in the specific embodiments disclosed without departing from the spirit of the invention or the scope of the following claims.

I claim:

1. An apparatus for improving the performance of electric boilers of the type having at least one electrode and in which the load is regulated by changing the water level on the electrodes, said electrodes being insulated from the boiler shell and normally being at least partially submerged in the boiler water, comprising pumping means for taking water from the boiler and spouting it up under each electrode with sufficient volume to cover the lower ends of the electrodes and with sufficient velocity to climb at least part way up their sides.

2. An apparatus according to claim 1 including water communication means fixing the lower limit of the water level below the tips of the electrodes, whereby very light power loads may be maintained.

3. An apparatus according to claim 2 including means for directing the boiler feed water supply into the spouts of water.

4. An apparatus according to claim 3 wherein means is provided for adjusting the velocity of the spouts of water.

5. An apparatus for improving the performance of electric boilers of the type having at least one electrode and in which the load is regulated by changing the water level on the electrodes, said electrodes being insulated from the boiler shell and normally being at least partially submerged in the boiler water, comprising a water circulating pump having intake communication with the boiler water below the lowest operating level thereof, driving means connected with said pump, a distributor having water communication with the outlet of said pump, and a water spout for each electrode having water communication with said distributor and terminating directly under and pointing upwards towards its associated electrode.

6. An apparatus according to claim 5 including water communication means fixing the lower limit of the water level below the tips of the electrodes, whereby very light power loads may be maintained.

7. An apparatus according to claim 6 wherein the said distributor includes water communication with the boiler feed water supply.

8. An apparatus according to claim 7 wherein said water communication between the water circulating pump and distributor includes a valve for adjusting the rate of flow.

9. An apparatus according to claim 8 wherein the water spouts are provided with replaceable caps.

10. An apparatus according to claim 9 wherein the said water spouts are made of insulating material.

11. An apparatus according to claim 9 wherein the water spouts are solidly grounded to the boiler shell.

12. An electric boiler comprising (a) a pressure vessel, (b) a feed water inlet, (c) a steam outlet, (d) at least one electrode, said electrodes being insulated from the pressure vessel and normally being at least partially submerged in the boiler water, (e) means to regulate the load by changing the water level on the electrodes, and (f) pumping means to spout boiler water up under each electrode with sufficient volume to cover their tips and with sufficient velocity to climb at least part way up their sides.

13. An electric boiler according to claim 12 including water communication means fixing the lower limit of the water level below the tips of the electrodes, whereby very light power loads may be maintained.

14. An electric boiler according to claim 13, including means for directing the water from the feed water inlet into the spouts of water.

15. An electric boiler according to claim 14 wherein means is provided for adjusting the flow of water to the spouts.

16. An electric boiler comprising (a) a pressure vessel, (b) a steam outlet, (c) at least one electrode, said electrodes being insulated from the pressure vessel and normally being at least partially submerged in the boiler water, (d) means to regulate the load by changing the water level on the electrodes, (e) a water circulating pump having intake communication in the boiler water below the lowest operating level thereof, (f) a feed-water pump, (g) a water spout pointing upward under each of said electrodes, (h) a common water communication between the outlets of said pumps and said water spouts, and (i) water communication means fixing the lower limit of the water level below the tips of the electrodes.

MILTON EATON.

REFERENCES CITED

The following references are of record in the file of this patent:

UNITED STATES PATENTS

| Number | Name | Date |
|---|---|---|
| 1,462,350 | Merrill et al. | July 17, 1923 |
| 1,610,751 | Dantsizen | Dec. 14, 1926 |
| 1,636,788 | Schleck | July 26, 1927 |
| 1,738,733 | Schur et al. | Dec. 10, 1929 |
| 2,088,932 | Stalhane | Aug. 3, 1937 |